United States Patent [19]

DeBlasi et al.

[11] Patent Number: 4,857,624
[45] Date of Patent: Aug. 15, 1989

[54] PHENOLIC-MODIFIED ROSIN ESTER PRINTING INKS

[75] Inventors: Douglas S. DeBlasi, Fairfield; John P. Walsh, Whippany, both of N.J.

[73] Assignee: BASF Corporation, Clifton, N.J.

[21] Appl. No.: 199,555

[22] Filed: May 27, 1988

[51] Int. Cl.$^4$ ............................................. C08G 14/04
[52] U.S. Cl. ..................................... 528/129; 528/140; 528/142; 528/158.5; 528/159; 528/161; 528/176; 528/230; 528/245.3; 525/54.4; 525/54.42; 523/160; 106/29; 106/30
[58] Field of Search ............ 528/129, 140, 142, 158.5, 528/159, 161, 176, 230, 245.3; 525/54.4, 54.42; 523/160; 106/29, 30

[56] References Cited

U.S. PATENT DOCUMENTS

| | | | |
|---|---|---|---|
| 2,478,490 | 8/1949 | Krumbhaar | 525/54.4 |
| 3,860,670 | 1/1975 | Uhlemayr et al. | 525/135 |
| 3,880,788 | 4/1975 | Rudolphy | 525/54.42 |
| 3,896,064 | 7/1975 | Koishi et al. | 525/54.4 |
| 4,391,640 | 7/1983 | Okoshi et al. | 106/29 |

Primary Examiner—John Kight
Assistant Examiner—S. A. Acquah
Attorney, Agent, or Firm—Michael R. Chipaloski

[57] ABSTRACT

Improved phenolic-modified rosin ester resins are disclosed. The phenolic-modified rosin ester resins comprise the reaction product of substantially unsaturated rosins with a dienophile, a phenolic compound and a formaldehyde-containing compound, which product is then esterified. The resulting composition is useful in vehicles for publication gravure printing inks, as well as in the printing inks themselves. Printing inks fabricated in accordance with the invention employing these improved phenolic-modified rosin ester resins provide prints of superior quality.

19 Claims, 4 Drawing Sheets

PHENOLIC-MODIFIED ROSIN ESTER PRINTING INKS

FIELD OF THE INVENTION

The present invention relates to a process for producing a phenolic-modified rosin ester resin having excellent properties which make it useful in formulating vehicles for gravure printing inks. The invention also relates to a phenolic-modified rosin ester resin prepared by the process of the invention as well as vehicles for gravure printing inks employing the phenolic-modified rosin ester resin and to printing inks including this vehicle.

BACKGROUND OF THE INVENTION

Phenolic-modified rosins have come into widespread use in vehicles for lithography printing ink, typography printing ink, and gravure printing ink. However, these inks are usually quite costly. In addition, with the development of the printing arts, the speeds of printing have become increasingly high, and requirements for various ink properties such as gloss, drying properties, holdout, film formation, film integrity, reducibility and printability have become increasingly rigorous. Various types of resins have been developed in order to meet these requirements.

For example, in U.S. Pat. No. 2,478,490 issued in August, 1948, there are disclosed rosin-modified, phenol/formaldehyde resins containing rosin esterified by polyhydric alcohols and reinforced by polybasic acids of the maleic type which are useful as printing inks. These rosin-modified phenol/formaldehyde resins and rosin-modified maleic esters are prepared by heating rosin together with phenol/formaldehyde condensates, with maleic-type polybasic acids, or both and subsequently esterifying with polyhydric alcohol in a manner which avoids gelation. This patent goes on to indicate that when the molecular weight of such printing inks is enlarged, they gain considerably in hardness, solubility, chemical resistance and heat stability.

Several methods are disclosed to achieve higher molecular weights. The usual method consists of increasing the amount of phenol formaldehyde condensate, maleic acid-type compound, or polyhydric alcohol, to be combined with the rosin element in the resin. However, both processes and products have definite disadvantages. For example, the procedure is not practical for mass production because gelatinization may occur at an early moment. Further, the products, due to their excessive content of expensive additional compounds, are high in cost, possess low solubility, and contain large percentages of over-polymerized resin particles which render them non-homogeneous.

U.S. Pat. No. 3,896,064 (Koishi, et al) issued on July 22, 1975, discloses vehicles for printing inks containing a resinous component. The resinous component is prepared by the addition reaction of a petroleum resin with at least one unsaturated polybasic acid or anhydride and by subsequent reaction of the resultant product with rosins or rosin-derivatives containing a polyamine to permit quick setting, bring good gloss and provide good stability on printing presses at low-cost. These inks do not contain a phenol/formaldehyde condensation product.

U.S. Pat. No. 4,391,640 (Okoshi, et al) issued on July 5, 1983, relates to a process for producing rosin-modified phenolic resins for printing inks. The process includes reacting a resol-type phenol/formaldehyde initial condensation product, an animal or vegetable oil, a rosin ester obtained by the reaction of rosin with alcohol, and an acid or a hydrocarbon resin. This ink vehicle exhibits excellent gloss and fast set.

There exists a need in the art of gravure printing inks for an ink which is inexpensive and exhibits high holdout, excellent printability and excellent reducibility to allow for a wider variety of gravure applications at lower cost. Further, there is also a need in the art for a more homogeneous printing ink vehicle which exhibits consistent properties.

SUMMARY OF THE INVENTION

The present invention relates to a method for the production of resins particularly suitable for use in printing ink vehicles for publication gravure printing. The method includes the steps of reacting a rosin with a sufficient amount of dienophile to produce a modified rosin. The modified rosin is then cooled to about 120°–140° C. A formaldehyde-containing compound and a phenolic compound are added separately to the cooled, modified rosin in a ratio of about 2.5 to about 3.1 moles of formaldehyde per mole of phenol. This mixture is refluxed to form a condensate phenolic resin and heating is continued to cause self-condensation of the phenolic resin. Finally, the phenolic resin is esterified with a polyfunctional hydroxy compound to produce a resin suitable for use in printing ink vehicles for gravure printing inks.

In a second aspect, the present invention also relates to a method of preparing printing ink vehicles and printing inks employing the resins of the invention. The printing inks employing these resins exhibit excellent printability, reducibility and high holdout. These inks are also relatively inexpensive.

In another aspect, the present invention relates to novel resins produced by the process of the invention and having a molecular weight distribution which makes them particularly suitable for the formulation of printing ink vehicles for gravure printing inks. The invention also embodies printing ink vehicles including these resins and printing inks employing vehicles which are organic solutions of resins.

In accordance with the present invention, it is possible to produce printing inks which exhibit high holdout, excellent printability and excellent reducibility and which are particularly suitable for use as printing inks for publication gravure printing. Further, the present invention provides resins which have a molecular weight distribution which make these resins particularly suited for gravure printing ink vehicles.

Accordingly, it is the primary object of the present invention to provide improved resins for use in printing ink vehicles for gravure printing which have an improved molecular weight distribution.

It is a further object of the present invention to provide a process for making resins which are particularly useful as a component of printing ink vehicles for publication gravure printing.

It is a still further object of the present invention to provide a novel printing ink for use in gravure printing which exhibits high holdout, excellent printability and excellent reducibility.

These and other objects of the present invention will be apparent to one of ordinary skill in the art from the detailed description which follows.

DETAILED DESCRIPTION OF THE PREFERRED EMBODIMENTS

Figure 1:
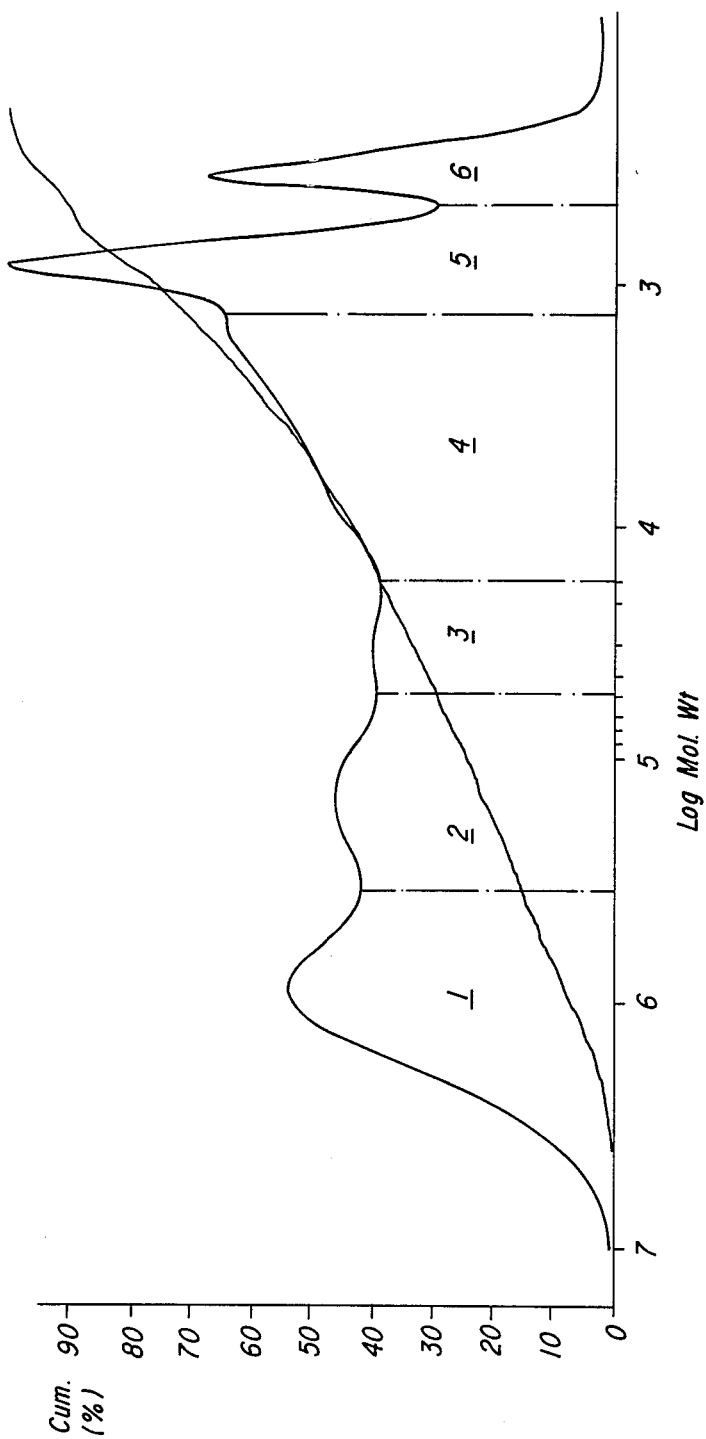
FIG. 1 illustrates the size exclusion chromatogram of a resin fabricated in accordance with Example 1.
Figure 2:
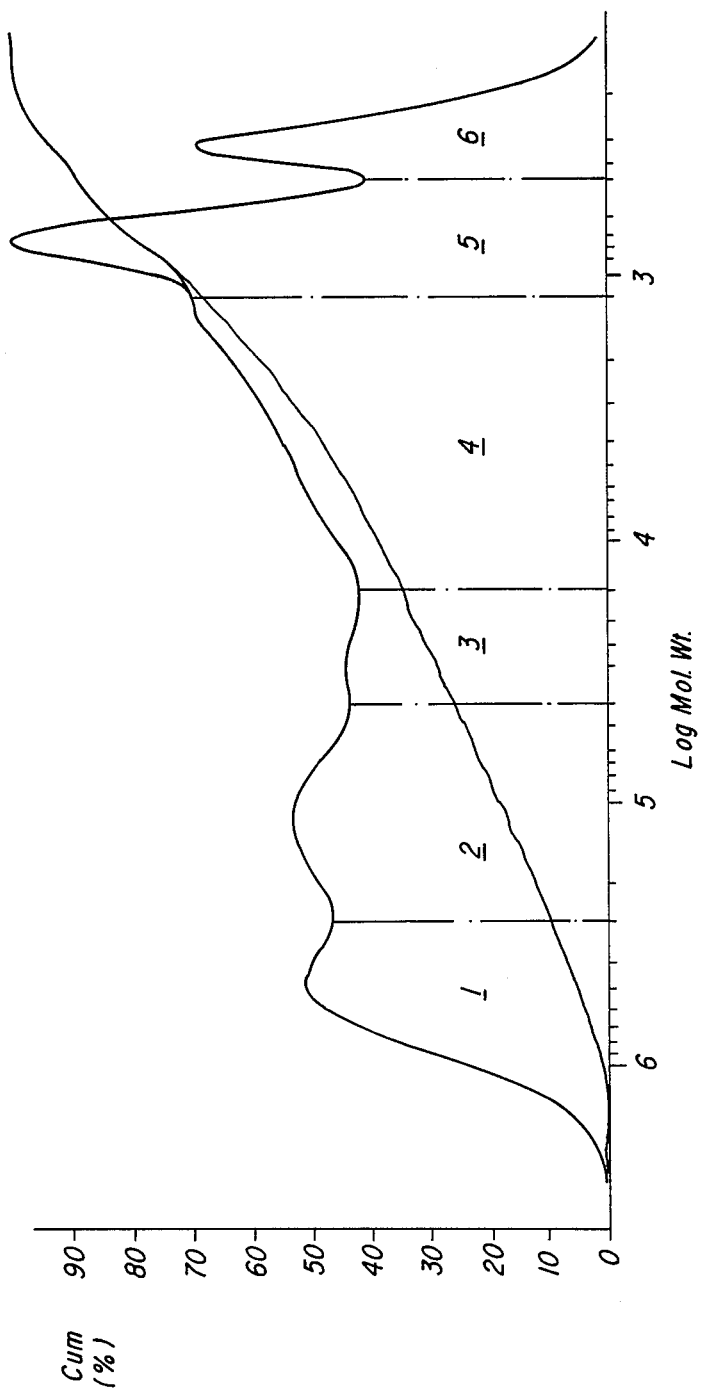
FIG. 2 illustrates the size exclusion chromatogram of a resin fabricated in accordance with Example 3.

In accordance with the present invention, there is produced a phenolic-modified rosin ester resin having a high molecular weight. The high molecular weight is developed by reaction at the carboxyl groups of the rosin component as well as reaction at the rosin unsaturation. Another significant result of the present process of fabricating phenolic-modified rosin esters is the production of resins having a highly advantageous molecular weight distribution as shown in FIGS. 1 and 2. The result of this molecular weight distribution is improvement in the holdout, printability and reducibility of ink products embodying these resins.

In one aspect of the present invention, the method comprises reacting rosin and a dienophile to produce a modified rosin. The modified rosin is cooled to about 120°–140° C. Then, a phenolic component and a formaldehyde-containing component are added separately to the modified rosin. The mixture is heated and eventually forms a phenolic resin. The phenolic resin is further heated to cause self-condensation of the phenolic resin and of remaining rosin unsaturation to produce a compound having a high molecular weight. Finally, the high molecular weight compound is esterified with a polyfunctional hydroxy compound and continuously heated until the desired viscosity and molecular weight distribution are attained.

In the first step of the method of the present invention, a rosin is charged to a reactor and heated until melted. The melted rosin is agitated as soon as the melting process makes it possible and agitation is continued throughout the process. Then the dienophile is added and the mixture is heated to cause a Diels-Alder (cycloaddition) reaction between the dienophile and the rosin component. Heating is continued until a modified rosin is produced having an acid value of from about 210 to 220.

The modified rosin produced by the first step in the process is cooled to between about 120° C. and 140° C. while stirring is continued. During the cooling step, the phenolic compound may also be added to the reactor to aid the cooling once the temperature has dropped to below 140° C. The cooling is continued down to preferably about 125° C. The phenolic compound may also be added after cooling is nearly completed but, if this option is selected, care must be taken to ensure that the temperature of the reaction vessel does not fall below 120° C. to avoid solidification of the reaction mixture. Then a formaldehyde source is charged to the reactor. Optionally, alkaline catalyst may also be charged to the reactor at this time. The alkaline catalyst has as its purpose the enhancement of the reaction between the formaldehyde-containing compound and the phenolic compound.

Once the phenolic compound, formaldehyde source and, optionally the catalyst have been charged to the reaction vessel containing the modified rosin, the reactor is set for full reflux and heated to maximize the reaction of the formaldehyde source and the phenolic compound to form an in situ phenolic. The entire reaction is accomplished under vigorous agitation. After this heating period, the reactor is set for water collection and heated to from about 177° to 183° C. uniformly over a period of about 1 hour. The uniform heating minimizes foaming and loss of formaldehyde from the reaction vessel. The reaction mixture is held at that temperature under vigorous agitation for an additional time period sufficient to produce a phenolic resin having an acid value of from about 170 to about 180, and a capillary-softening point between about 100° and 110° C. Also, during this heating period, self-condensation of the phenolic resin and of the remaining rosin unsaturation occurs.

It is also possible to carry out the cycloaddition reaction of the rosin and the dienophile after the phenolic compound-formaldehyde reaction in the presence of the rosin. Thus, it is to be understood that the phenolic compound, the formaldehyde source and optionally the alkaline catalyst can be charged to, and reacted in the presence of, the melted rosin prior to charging the dienophile and carrying out the cycloaddition reaction of the rosin with the dienophile.

In the final reaction step, a polyfunctional hydroxy compound is added to the reaction mixture to esterify the phenolic resin. Optionally, the polyfunctional hydroxy may be added along with an alkaline catalyst to enhance the esterification reaction.

The best procedure for charging the polyfunctional hydroxy compound and the optional catalyst to the reaction vessel is by mixing the polyfunctional hydroxy compound with the catalyst and dividing the mixture into several equivalent portions which are added uniformly over a limited time period while the reaction vessel and its contents are held at 177° to 183° C. and vigorously agitated. The most desirable addition procedure involves 5 portions of polyfunctional hydroxy compound and catalyst added at 15 minute intervals over a one hour period. The entire addition procedure is done under vigorous agitation.

After addition of the polyfunctional hydroxy compound and optional alkaline catalyst, the reaction vessel is heated to 257° to 263° C. uniformly over a period of about 3 hours. This heating is designed to maximize the esterification of the phenolic resin. Uniform heating minimizes sublimation of the polyfunctional hydroxy compound. Heating is continued at the same temperature until the Gardner viscosity at 50% TNV in toluene is greater than or equal to M - N.

Once the Gardner viscosity at 50% TNV in toluene is greater than or equal to M - N, the temperature of the reaction vessel is lowered slightly to 245°–255° C. and heating is continued under vigorous agitation until the Gardner viscosity at 50% TNV in toluene reaches at least W - X. At this point, the acid value of the product should be from about 25 to 35. Optionally, heating can be continued if a higher viscosity resin is desired. Viscosities greater than or equal to Gardner Z6 have been attained by continuing heating for additional time.

Once the Gardner viscosity at 50% TNV in toluene is at least W - X, heating is discontinued and the phenolic-modified rosin ester resin is removed and cooled to produce a solid resin product or, alternatively, it is quenched with slow addition of an organic solvent. Typically, an organic solvent which may be used to formulate a printing ink vehicle is used to quench the reaction since the resultant solution may then be directly used to make printing inks without requiring an additional solvent removal step. The quenching procedure of Example 1 is the best procedure for cooling the reaction vessel.

The most preferred organic solvents are aromatic solvents such as toluene and xylene, although other suitable organic solvents, or mixtures thereof, may be used. The entire amount of the organic solvent is added gradually and mixed with the reaction product to produce a uniform solution at 45–60% TNV. If necessary, the final TNV can be adjusted by adding additional quantities of the organic solvent. The organic solvent should be highly volatile to allow quick drying of the printing inks in which it is included.

The rosin employed in the present invention is preferably one having a relatively high degree of unsaturation such as gum rosin since it gives higher softening points and higher viscosities for a given degree of reaction. Other suitable rosins for use in the present invention include tall oil rosin, wood rosin, polymerized rosin and blends of wood rosin with other rosins. Preferred rosins have at least 70% reactive, unsaturated rosin acids. The rosin component makes up 58–79% weight percentage and preferably 65–80% of the total reactants.

The preferred dienophiles for reaction with the rosin component are fumaric acid, maleic acid, acrylic acid, methacrylic acid, itaconic acid and maleic anhydride. It is possible to substitute other dienophiles therefor although they are less preferred. The dienophile is preferably used in an amount of from about 0.16 to about 1.0 equivalents per equivalent of rosin and more preferably comprises from about 0.3 to about 0.6 equivalents per equivalent of rosin.

Several formulations have been made in laboratory experiments which demonstrate the scope of the resins which can be made by the process of the present invention. The ratio of the hydroxyl-OH to the carboxyl-COOH has been varied from 1.05 to 1.25 and is preferably from about 1.05 to about 1.15.

The phenolic compound and the formaldehyde-containing compound are added as separate components in the method of the present invention. The type of phenolic compounds utilized may vary widely, the principal types employed being the para-tertiary-alkyl phenols and the bisphenols, such as bisphenol A. Other useful phenolic compounds may include phenol, cresol, para-octyl phenol and para-nonyl phenol. The phenolic compound makes up about 5–15 wt. % and more preferably 8–12 wt. % of the reactants. Phenolic compounds having high functionality are the most preferred.

The formaldehyde-containing compounds useful in the present invention include formalin, paraformaldehyde and formaldehyde. Formaldehyde-containing compounds having high functionality are preferred. The preferred formaldehyde source is a formaldehyde solution or paraformaldehyde. When paraformaldehyde is used, is generally employed in the presence of an alkaline catalyst to enhance its reaction with the phenolic compound. The mole ratio of the formaldehyde-containing substance to the phenolic compound is suitably from 2.0 to 3.1 moles of formaldehyde per mole of phenol, more preferably, from about 2.5 to about 3.0, and most preferably about 2.6–2.9 moles of formaldehyde per mole of phenol. The equivalent ratio of formaldehyde to bisphenol A may be from 0.25 to 1.0 and more preferably is from 0.6 to 0.75. The most preferred equivalent ratio being 0.7.

The molar percentage of in situ phenolic, formed by the reaction of the phenolic compound and the formaldehyde-containing compound in the presence of either the rosin or the modified rosin, to the rosin is from 5 mole percent to 30 mole percent and more preferably from 10 mole percent to 20 mole percent.

The alkaline catalyst is added in an amount sufficient to enhance the reaction between the formaldehyde-containing compound and the phenolic compound. The preferred catalyst is a magnesium oxide catalyst, although other alkaline catalysts such as calcium acetate, dibutyltin oxide as well as calcium acetate/magnesium oxide blends and calcium acetate/zinc oxide blends may be employed. The amount of alkaline catalyst used is from about 0.003 to about 0.008 equivalents per equivalent of rosin, of the total reactants, and most preferably from about 0.0045 to about 0.007 equivalents per equivalent of rosin. The alkaline catalyst is generally added prior to the addition of the formaldehyde-containing compound, though it is possible to add the catalyst along with, or just after, addition of the formaldehyde-containing compound. Magnesium oxide catalysts having particle sizes from 50–65 $m^2$/gram through 170–200 $m^2$/gram have been successfully used in the process.

Suitable polyfunctional hydroxy compounds useful in esterifying the phenolic resins include, but are not limited to glycols, such as ethylene glycol, diethylene glycol, glycol, dipropylene glycol, butylene glycol, neopentyl glycol, hexanediol, hexanetriol, glycerol, trimethylol ethane, trimethylol propane, glycerine, and pentaerythritols such as mono-, di- and tri-penthaerythritols. The pentaerythritols are especially preferred due to their high functionality. The polyfunctional hydroxy compound comprises from about 1.4 to about 1.9 equivalents per equivalent of the rosin component, and more preferably from about 1.6 to about 1.85 equivalents per equivalent of the rosin component.

The physical properties of the phenolic-modified rosin ester resin made by the process of the present invention include a Gardner viscosity at 25° C. in 50% toluene in the range of X to at least Z6. The most useful toluene solutions of the phenolic-modified rosin ester have viscosities of W - Z2, and preferably X-Z1 in 50% toluene solutions at 25° C. Gelation is not a difficulty in the present invention. The Brookfield viscosity at 25° C. in 50% toluene is from 2.5 to 25 poises, the preferred Brookfield viscosity being 15–21 poises at 25° C. in 50% toluene. The resin also has an acid value of which may vary from 24 to 35 and a capillary-softening point of from 140° C. to 158° C. depending upon the particular resin. The solution in 50% toluene appears to be a clear, light amber solution without gels.

The phenolic-modified rosin ester, in solution in the organic solvent, may be used directly as a vehicle for gravure printing inks. Preferably, the phenolic-modified rosin ester solution has a TNV of from 45% to 60% and more preferably from 49% to about 53%. The dilution value (milliliters of solvent required to reduce the viscosity of 100 grams of 50% TNV vehicle to 18 seconds in a Shell #2 cup at 25° C.) is typically 150–160 milliliters of toluene per 100 grams of vehicle.

One of the primary advantages of the process of the present invention is that it produces a phenolic-modified rosin ester having a molecular weight distribution which is relatively concentrated at the higher molecular weight end of the distribution as shown in FIGS. 1-2. This leads to a more uniform ink vehicle composition as well as more consistent printing results, improved hold-out, and superior reducibility of ink products employing this ink vehicle.

The phenolic-modified rosin ester fabricated by the process of the present invention is a substantial improvement over prior art resins used in printing ink vehicles, not only because of its advantageous molecular weight distribution, but also because inks employing vehicles made with the rosin ester resins of the present invention exhibit higher holdout than present, commercially available inks, excellent reducibility which is superior to commercially available inks and excellent printability.

Figure 3:
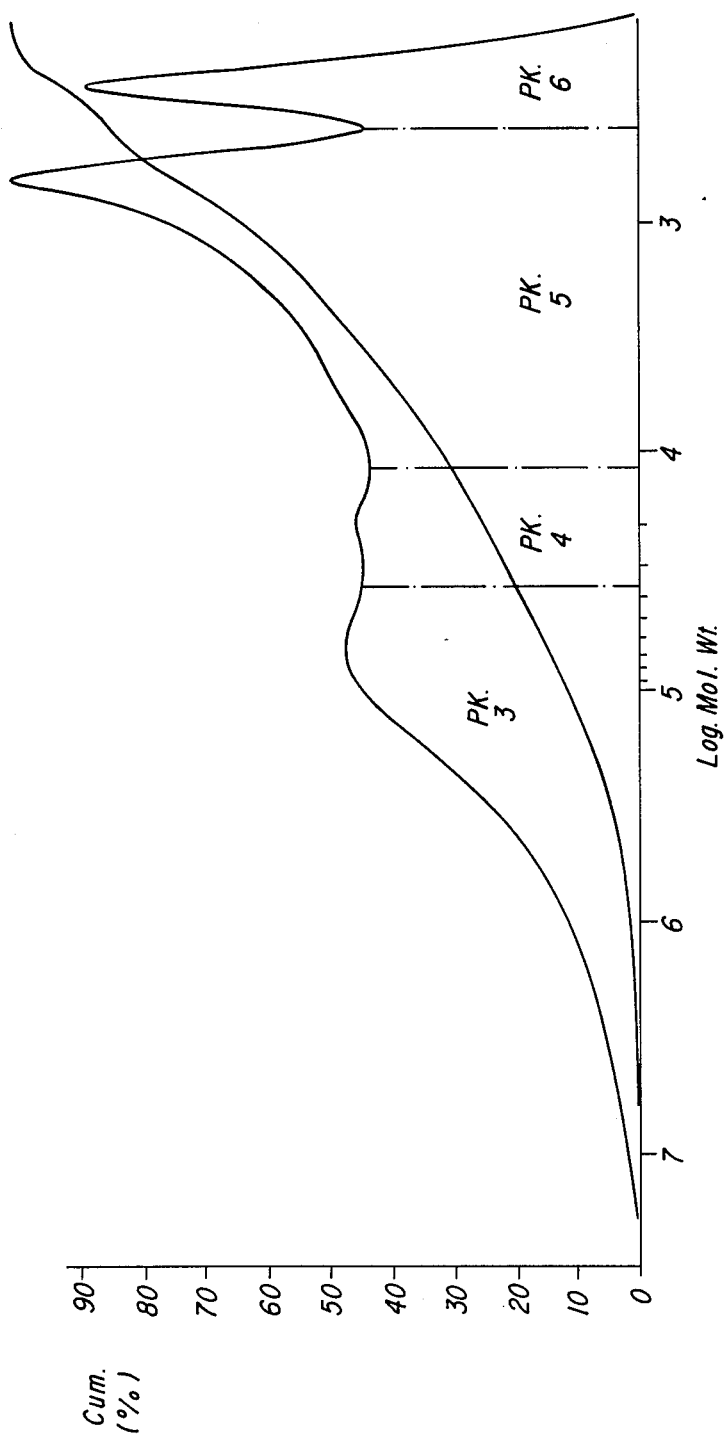
FIG. 3 illustrates the size exclusion chromatogram of a commercially available phenolic modified rosin resin currently employed in the trade of gravure printing.
Figure 4:
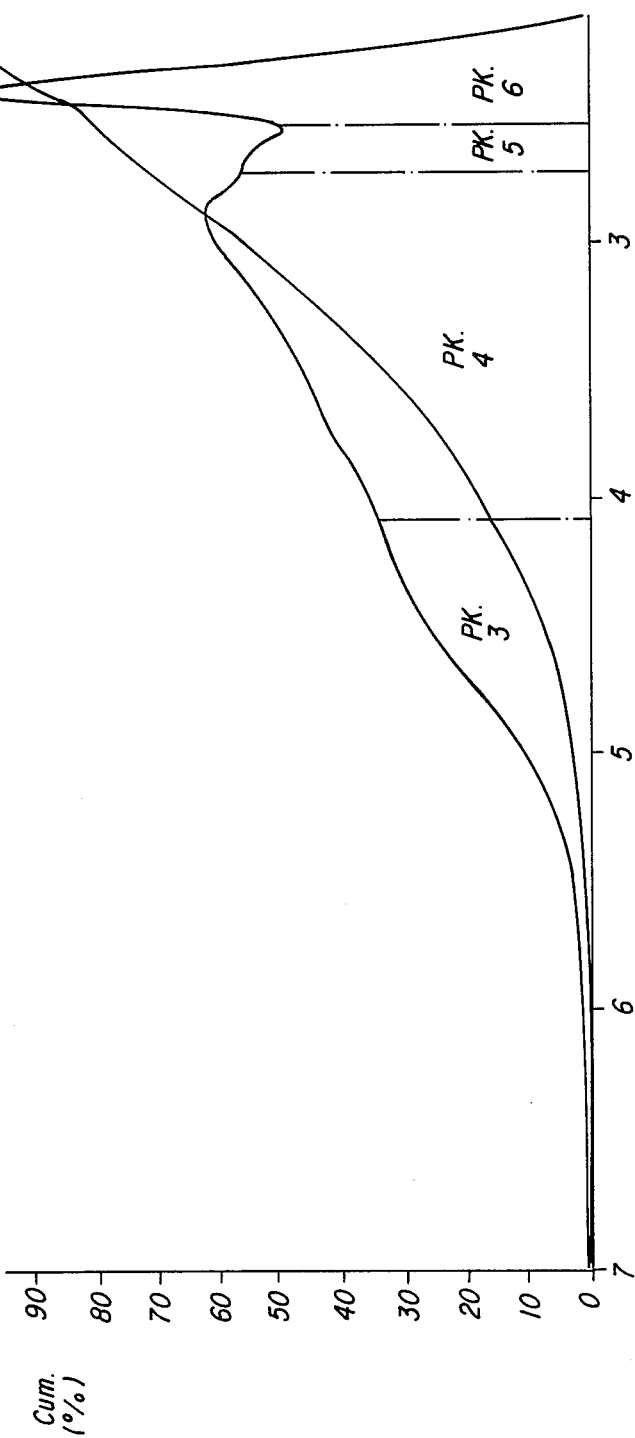
FIG. 4 illustrates the size exclusion chromatogram of a currently employed in the trade of gravure printing.

Referring to FIGS. 1 and 2, there are shown the molecular weight distributions of the phenolic-modified rosin ester resins produced by the processes of Examples 1 and 3 respectively. In FIGS. 3 and 4, there are shown the molecular weight distributions of two different, commercially available phenolic-modified rosin resins which are presently employed in publication gravure printing ink vehicles. A comparison of the molecular weight distribution of resins fabricated in accordance with the present invention to the commercially available resins shows that the resins of the present invention contain two high molecular weight fractions (Peaks 1 and 2) which are not present in the commercially available resins. Further, the commercially available resins contain significantly more residual starting materials than do the resins of the present invention as shown by Peak No. 6. Finally, it can be seen from these figures that the resins of the present invention contain a significantly greater percentage of high molecular weight components in comparison with the commercially available resins.

Figure 5:
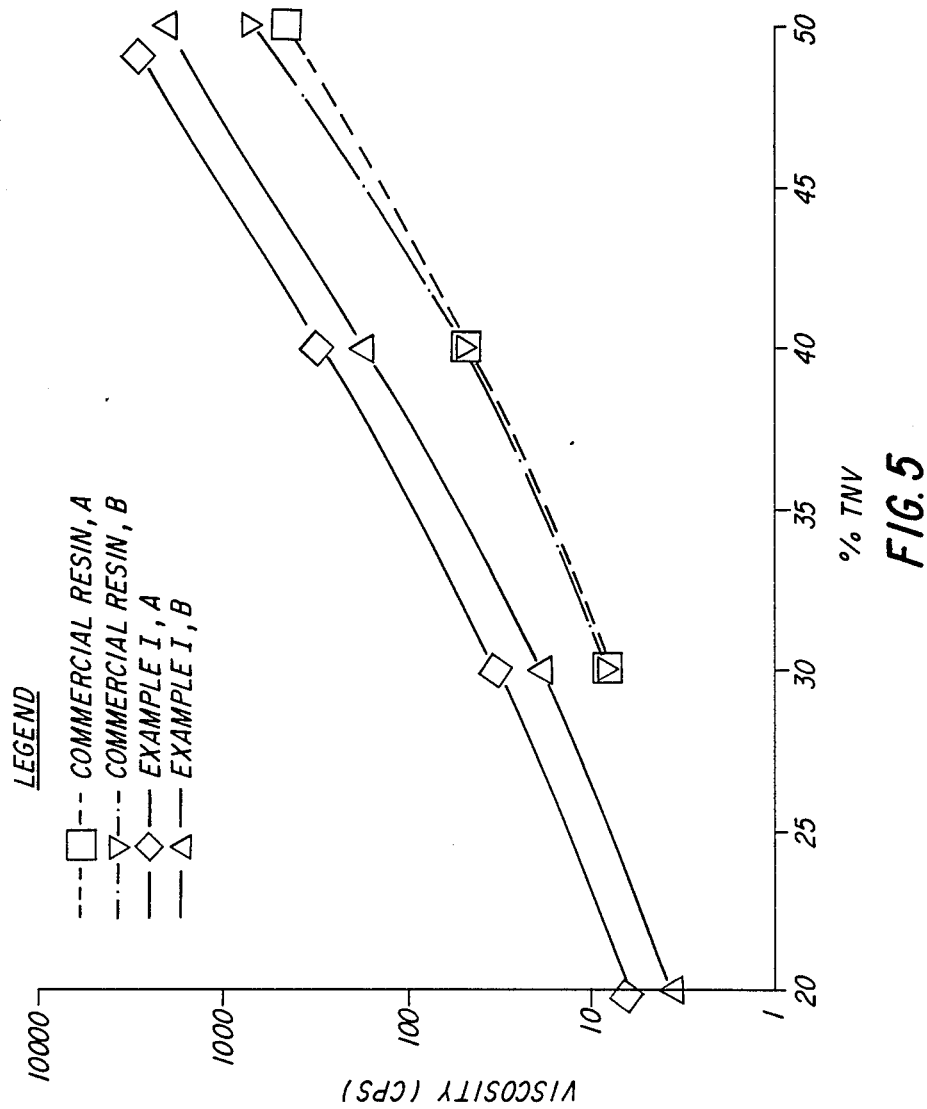
FIG. 5 is a dilution curve comparing the reducibility of two commercially available phenolic modified rosin resins with two phenolic modified resin ester resins fabricated in accordance with Example I of the present invention.

The unique characteristics of the molecular weight distributions of the resins of the present invention manifest themselves in the form of higher holdout, improved reducibility and excellent printability in printing inks employing these resins in the vehicle component. Referring to FIG. 5, there is shown a dilution curve which compares two commercially available resins for use in printing ink vehicles, with two resins of the present invention taken from Example I. From FIG. 5 it can be seen that the resins of the present invention, when used to formulate ink vehicles, produce ink vehicles having a consistently higher viscosity than ink vehicles produced with the commercially available resins. Higher viscosity ink vehicles are highly desirable since they allow a much greater reducibility by dilution with inert carrier materials while maintaining an acceptable viscosity level. In this manner, the resin ink vehicles of the present invention can be used in smaller quantities to provide the same level of quality in publication gravure printing inks. This leads to a significant reduction in cost as a result of the ability to substitute cheaper, inert carrier materials for the more expensive resin products.

For printing on coated stock, these inks have high gloss, as well as good film formation properties and film integrity. These important and advantageous properties make the printing inks fabricated in accordance with the present invention a valuable commodity which greatly enhances the quality of publication gravure printing.

The printing inks formulated in accordance with the present invention include the phenolic-modified rosin ester in an organic solvent as the printing ink vehicle. These printing inks are made in the same manner as conventional printing inks except the resin of the present invention is employed in the ink vehicle. The inks may optionally include other ingredients which are typically used in printing inks. The pigments used in the printing inks are well-known to those of ordinary skill in the printing art.

The ink compositions are generally prepared by dispersing in a mill, pigment, clay, hydrocarbon solvent, metalated resinate, lecithin and a small amount of an organic compound. This dispersion is then reduced with a mixture of metalated resinate, cellulose, alcohol solvent, hydrocarbon solvent and the resin vehicle of the present invention to produce an excellent printing ink suitable for use in publication gravure printing. Generally about 32% of the ink comprises the pigment component, 43% of the ink comprises other ingredients and the remaining 25% of the ink comprises the resin vehicle.

The following examples are provided to further illustrate the present invention and are not to be construed as limiting the invention in any manner. All parts are parts by weight unless otherwise stated.

EXAMPLE 1

TABLE 1

| I. Phenolic-Modified Rosin Ester Reaction | Wt. % | Equivalents |
|---|---|---|
| A. Gum Rosin Acid WW | 72.28 | 1.0 |
| B. Fumaric Acid | 5.62 | 0.456 |
| C. Bis Phenol A | 7.27 | 0.60 |
| D. Magnesium Oxide | 0.04 | 0.0045 |
| E. Paraformaldehyde | 2.94 | 0.42 |
| F. Pentaerythritol | 11.78 | 1.603 |
| G. Magnesium Oxide | 0.06 | 0.007 |
| | 100.00 | |
| Yield 93–95% | | |
| II. Solution Quench | | |
| H. Toluene | 95.0 | |

The equivalent ratio of hydroxyl-OH to carboxyl-COOH is 1.1:1. The equivalent ratio of formaldehyde to bisphenol-A is 0.7. The molar percentage of in situ phenolic (from the bisphenol-A/formaldehyde reaction) to rosin acid is 15 mole percent.

The following process was employed to fabricate a printing ink vehicle from the ingredients listed in Table 1:

A two-liter, four-neck, round-bottom flask was employed as the reactor. Other equipment included a ¼" diameter thermocouple (thermometer), a ¼" diameter $N_2$ inlet tube, a 10 mm diameter stainless steel stirrer with 110 mm diameter paddle, and a Dean-Stark trap with condenser.

The reactor is initially set for water collection and nitrogen sparge. Then, A is charged with the nitrogen on and heated to melt the rosin (approximately 80° C.). Agitation is turned on as soon as the viscosity of the rosin permits. Heating is continued to 125° C.±5° C. and agitation is adjusted to approximately 200 rpm in the laboratory reactor.

At this point, B is charged and the agitation is increased to 250 rpm. The reaction mixture is then heated to 220° C.±3° C. uniformly over a one-hour period.

Water is collected while maintaining the temperature of the reaction vessel constant for an additional 30 minutes.

The next step in the process involves cooling the reaction vessel to 125° C.±5° C. To aid cooling, at 140° C., C is charged to the reactor. The agitation is then increased to 300 rpm and cooling continued to 125° C. D is then charged first and then E. The temperature is not allowed to fall below 120° C. Once D and E are completely charged, the reactor is set for full reflux and heated to 130° C. for two hours to maximize the reaction between the formaldehyde and bisphenol A. Then, the reactor is set for water collection and heated to 180° C.±3° C. uniformly over a one-hour period in order to minimize foaming or loss of formaldehyde. Finally, the reactor is held at 180° C. for an additional hour and stirring is maintained at 300 rpm.

Elements F and G are then mixed and divided into 5 equal portions. Then, F and G are added over a one-hour schedule at 180° C. Water is collected over this one-hour period and the agitation is adjusted to 350 rpm. The reactor is then heated to 260° C.±3° C. uniformly over 3 hours while continuing to collect water. Uniform heating is necessary to minimize pentaerythritol sublimation. Next, the reactor is held at the same temperature for an additional three hours.

Then 15 grams of the reaction product are sampled for Gardner viscosity at 50% TNV in toluene. If the Gardner viscosity is greater than or equal to M - N, the temperature of the reaction vessel is reduced to 250° C.±2° C. and maintained at that temperature until the Gardner viscosity reaches Gardner W X. If the Gardner viscosity is less than M - N, heating is continued at 260° C.±3° C. for additional half-hour periods until the Gardner viscosity reaches or exceeds M - N, whereupon the temperature is reduced to 250° C.±2° C. and heating is continued until the solution viscosity at 50% TNV in toluene is Gardner W - X. At this point, the acid value of the reaction product should be 30±5.

At Gardner W - X, the heat is turned off and the solution is quenched with slow addition of H, under reflux. Cooling is continued until the reactor is at or below 180° C.±5° C. Mixing is continued to affect a uniform solution at 50% TNV and, if necessary, the final TNV may be adjusted with added H. The reaction product is finally cooled to room temperature and discharged.

TABLE 2

| Typical Physical Properties of Product | |
|---|---|
| Appearance | Clear, light amber solution without gels |
| TNV | 50 ± 1 |
| Gardner Viscosity, 25° C. 50% toluene | X − Y |
| Brookfield Viscosity, 25° C. 50% toluene | 18 poises ± 3 poises |
| Acid Value on Solids | 30 ± 5 |
| Capillary Softening Point | 148° C. ± 5° C. |

The molecular weight distribution of the reaction product is shown in FIG. 1. All molecular weight data are relevant only to polystyrene reference standards and only when a refractive index detector is employed. The reaction product has six major components labeled peaks 1-6. Table 3 provides detailed information on the molecular weight distribution of the reaction product.

TABLE 3

| Molecular Weight Distribution | | | | | |
|---|---|---|---|---|---|
| Peak # | Average Mn | Average Mw | Dispersity | Pmol.Wt | % of Total Area |
| 1 | 737,167 | 1,161,684 | 1.57 | 821,394 | 15.3 |
| 2 | 104,051 | 136,934 | 1.31 | 132,784 | 14.3 |
| 3 | 27,657 | 29,927 | 1.08 | 31,576 | 7.8 |
| 4 | 2,982 | 5,176 | 1.73 | 1,210 | 34.7 |
| 5 | 760 | 806 | 1.06 | 810 | 17.9 |
| 6 | 303 | 318 | 1.04 | 341 | 10.0 |

| Total Molecular Weight Distribution | | |
|---|---|---|
| Averaqe Mn | Averaqe Mw | Dispersity |
| 1,420 | 200,049 | 140 |

EXAMPLE 2

Several additional resins were fabricated which further demonstrate the scope of resins which can be made by modifying the process of the current invention. In this example, the process of Example 1 is modified by charging C and D to the reactor before charging B. Thus, after melting the gum rosin, C and D are charged to the reactor at 125° C. under vigorous agitation without allowing the reactor temperature to fall below 120° C. E is also charged to the reactor at this time. Once C, D and E are completely charged, the reactor is set for full reflux and heated to 130° C. for two hours to maximize the reaction between the formaldehye and bisphenol-A. Then, the reactor is set for water collection and heated to 180° C.±3° C. over a one hour period and held at this temperature for an additional hour maintaining stirring at 300 rpm.

Then, B is charged and the reactor is heated to 220° C.±3° C. uniformly over a one-hour period. Water is collected while maintaining the temperature of the reaction vessel constant for an additional 30 minutes.

The process is continued by charging elements F and G as in Example 1 and is performed exactly the same way as Example 1 for the remainder of the process.

In this example, the phenolic reactions between the phenolic compound and the formaldehyde source are carried out in the presence of the molten gum rosin prior to charging the dienophile and carrying out the cycloaddition reaction of the rosin acid with the dienophile. It was found that the products obtained from this process are comparable to the products obtained by the process of Example 1. Accordingly, the cycloaddition reaction may be performed after reacting the phenolic compound and the formaldehyde source in the presence of the melted rosin or prior to that reaction step.

EXAMPLE 3

In this example, the same process as in Example 1 is employed except the molten resin product is discharged before quenching. The process of Example 1 is followed until the resin product exhibits a viscosity of Gardner Y at 50% TNV in toluene. The resin is discharged from the reactor and allowed to cool in a pan and is broken-up to a suitable size for packaging. The solidified resin is a clear, amber solid having an acid value of about 25-35 and a capillary softening point of 143° C. to 153° C. When later dissolved in aromatic hydrocarbons such as toluene, the solid resin is equally as suitable for gravure inks as the resin solution obtained from Example 1. The molecular weight distribution of the solid resin produced by the process of this Example is shown in FIG. 2. Detailed Molecular Weight information is presented for this product in Table 4.

TABLE 4

| | Molecular Weight Distribution | | | | |
|---|---|---|---|---|---|
| Peak # | Average Mn | Average Mw | Dispersity | Pmol.Wt | % of Total Area |
| 1 | 488,441 | 598,148 | 1.22 | 468,221 | 9.9 |
| 2 | 86,458 | 116,009 | 1.34 | 111,889 | 16.6 |
| 3 | 22,989 | 24,704 | 1.07 | 28,584 | 7.9 |
| 4 | 2,767 | 4,602 | 1.66 | 1,153 | 33.3 |
| 5 | 679 | 730 | 1.07 | 701 | 21.2 |
| 6 | 267 | 284 | 1.06 | 306 | 11.1 |

| Total Molecular Weight Distribution | | |
|---|---|---|
| Average Mn | Average Mw | Dispersity |
| 1,163 | 79,897 | 69 |

EXAMPLE 4

In this example, the process of Example 1 is followed except the hydroxyl to carboxyl ratio is changed to 1.25 and the amount of pentaerythritol is increased to 1.82 equivalents. The physical properties of the resin product were within expected values. The Brookfield viscosity in 50% toluene at 25° C. was 20.7 poises.

EXAMPLE 5

In this example, the amount of phenolic compound and formaldehyde compound were varied to vary the molar percentage of in situ phenolic to rosin formed in the process. The following results were obtained by varying the molar percentage of in situ phenolic:

TABLE 5

| Molar percentage | Brookfield Viscosity (50% toluene, 25° C.) |
|---|---|
| 10 | 2.6 |
| 13 | 10.7 |
| 15 | 18 |

EXAMPLE 6

A resin vehicle fabricated by the process of Example 1 is employed as a vehicle in publication gravure blue printing ink. The blue ink was prepared by dispersing in a mill:

| Formula | Parts by Weight |
|---|---|
| Phthalocyanine Blue Pigment | 4.0 |
| Clay | 7.3 |
| Organic Compound | 0.2 |
| Lecithin | 0.2 |
| Hydrocarbon Solvent | 10.0 |
| Limed Rosin | 2.9 |
| Metalated Resinate | 30.0 | and then reducing the dispersion with

| Metalated Resinate | 27.7 |
|---|---|
| Hydrocarbon Solvent | 6.7 |
| Resin Vehicle of Example I | 16.0 |
| | 100.00 |

The resultant blue ink, when compared with commercially available blue inks used in publication gravure printing, showed greater reducibility, higher holdout and better printability.

EXAMPLE 7

A resin vehicle fabricated by the process of Example 1 is employed as a vehicle in a publication gravure yellow printing ink.

The yellow ink was prepared by dispersing in a mill:

| Formula | Parts by Weight |
|---|---|
| Diarylide Yellow Pigment | 2.3 |
| Clay | 24.8 |
| Organic Compound | 1.5 |
| Lecithin | 0.2 |
| Hydrocarbon Solvent | 10.0 |
| Metalated Resinate | 15.0 | and then reducing the dispersion with:

| Metalated Resinate | 10.1 |
|---|---|
| Cellulose | 0.2 |
| Alcohol Solvent | 0.1 |
| Hydrocarbon Solvent | 10.8 |
| Resin Vehicle of Example I | 25.0 |
| | 100.0 |

The resultant yellow ink, when compared with commercially available yellow inks used in publication gravure printing, demonstrated greater reducibility and higher holdout with equivalent printability.

EXAMPLE 8

A resin vehicle fabricated by the process of Example 1 is employed as a vehicle in a publication gravure red printing ink. The red ink was prepared by dispersing in a mill:

| Formula | Parts by Weight |
|---|---|
| Lithol Red Pigment | 6.4 |
| Clay | 7.4 |
| Organic Compound | 0.1 |
| Lecithin | 0.3 |
| Hydrocarbon Solvent | 10.0 |
| Metalated Resinate | 30.0 | and then reducing the dispersion with:

| Metalated Resinate | 23.5 |
|---|---|
| Cellulose | 0.1 |
| Hydrocarbon Solvent | 8.2 |
| Resin Vehicle of Example I | 14.8 |
| | 100.0 |

The resultant red ink, when compared with commercially available inks used in publication gravure printing, demonstrated higher holdout with equivalent printability.

Many modifications and variations of the present invention will be apparent to one of ordinary skill in the art in light of the above teachings. It is therefore to be understood that the scope of the invention is not to be limited by the foregoing description, but rather is to be defined by the claims appended hereto.

What is claimed is:

1. A method for the production of compositions particularly suitable for use in gravure printing comprising the steps of:

reacting a rosin with a sufficient amount of dienophile to produce a modified rosin, cooling the modified rosin to about 120°–140° C., adding sufficient amounts of a formaldehyde source and a phenolic compound in a ratio of about 0.25 to about 1.0 equivalents of formaldehyde per equivalent of phenol, to produce from about 0.05 to about 0.30 moles of an in situ phenolic per mole of rosin, refluxing the reaction mixture to form a phenolic resin, heating the phenolic resin for a sufficient time to cause self-condensation of the phenolic resin, and esterifying the phenolic resin with a polyfunctional hydroxy compound to produce a resin product.

2. A method in accordance with claim 1 wherein said adding step further comprises adding a sufficient amount of an alkaline catalyst to enhance the phenolic resin-forming reaction.

3. A method in accordance with claim 1 wherein said refluxing step comprises heating to about 127° C.–133° C. for from about 1 hour 45 minutes to about 2 hours 15 minutes to maximize the reaction of the formaldehyde source and the phenolic compound.

4. A method in accordance with claim 1 wherein the equivalent ratio of formaldehyde to phenol is from about 0.6 to about 0.75.

5. A method in accordance with claim 4 wherein said reacting step comprises reacting 1 equivalent of rosin with about 0.3 to about 0.6 equivalents of dienophile.

6. A method in accordance with claim 1 wherein the dienophile is selected from the group consisting of fumaric acid, maleic acid, maleic anhydride, acrylic acid, methacrylic acid and itaconic acid.

7. A method in accordance with claim 1 wherein said reacting step further comprises heating the rosin and the dienophile uniformly for about 15 minutes to about 1 hour 45 minutes at about 217° C. to about 223° C.

8. A method in accordance with claim 7 wherein said esterifying step comprises adding the polyfunctional hydroxy compound gradually over a period of approximately one hour at 177° C.–183° C., heating uniformly to 257°–263° C., and holding the reaction mixture at 257° C.–263° C., for a sufficient time to produce an esterified phenolic resin having a Gardner viscosity greater than, or equal to M-N at 50% TNV in toluene.

9. A method in accordance with claim 8 wherein said esterifying step further comprises the step of heating the esterified phenolic resin of Gardner viscosity M-N at from about 248° C. to about 252° C. until the Gardner viscosity of the resin is at least W-X at 50% TNV in toluene.

10. A method in accordance with claim 9 wherein said esterifying step further comprises addition of a sufficient amount of an alkaline catalyst to enhance the esterification reaction.

11. A method in accordance with claim 1 wherein the amounts of formaldehyde source and phenolic compound are sufficient to produce from about 0.10 to about 0.20 moles of in situ phenolic per mole of rosin acid.

12. A method in accordance with claim 1 wherein the total hydroxyl to total carboxyl equivalent ratio is from about 1.05 to 1.15.

13. A method in accordance with claim 6 wherein the phenolic compound is selected from the group consisting of bisphenols, para-tertiary-alkyl phenols, phenol, cresol, para-octyl phenol and para-nonyl phenol.

14. A method in accordance with claim 13 wherein the dienophile comprises fumaric acid, the phenolic comprises bisphenol A and the polyfunctional hydroxyl compound comprises pentaerythritol.

15. A method in accordance with claim 1 further comprising the step of dissolving the esterified phenolic resin having a Gardner viscosity of W-X in at least one organic solvent to produce a resin solution useful as a printing ink vehicle.

16. A method in accordance with claim 1 further comprising the step of adding a sufficient amount of a pigment to produce a composition useful as a printing ink.

17. A product produced by the process of claim 1.

18. A printing ink vehicle produced by the process of claim 15.

19. A printing ink produced by the process of claim 16.

* * * * *